E. J. ROOD.
FEEDING DEVICE.
APPLICATION FILED JUNE 18, 1917.

1,249,832.

Patented Dec. 11, 1917.

Inventor,
Edward J. Rood, by
G.C. Kennedy
Attorney.

UNITED STATES PATENT OFFICE.

EDWARD J. ROOD, OF WEBSTER CITY, IOWA.

FEEDING DEVICE.

1,249,832.  Specification of Letters Patent.  Patented Dec. 11, 1917.

Application filed June 18, 1917. Serial No. 175,412.

*To all whom it may concern:*

Be it known that I, EDWARD J. ROOD, a citizen of the United States of America, and a resident of Webster City, Hamilton county, Iowa, have invented certain new and useful Improvements in Feeding Devices, of which the following is a specification.

My invention relates to improvements in feeding devices, and the object of my improvement is to supply a feeding trough for sheep, having supporting means and a fender, to which it is so related as to permit the trough to be removed or tilted for emptying and cleansing, while preventing the animals from getting into the trough or fouling its contents.

Figure 1:
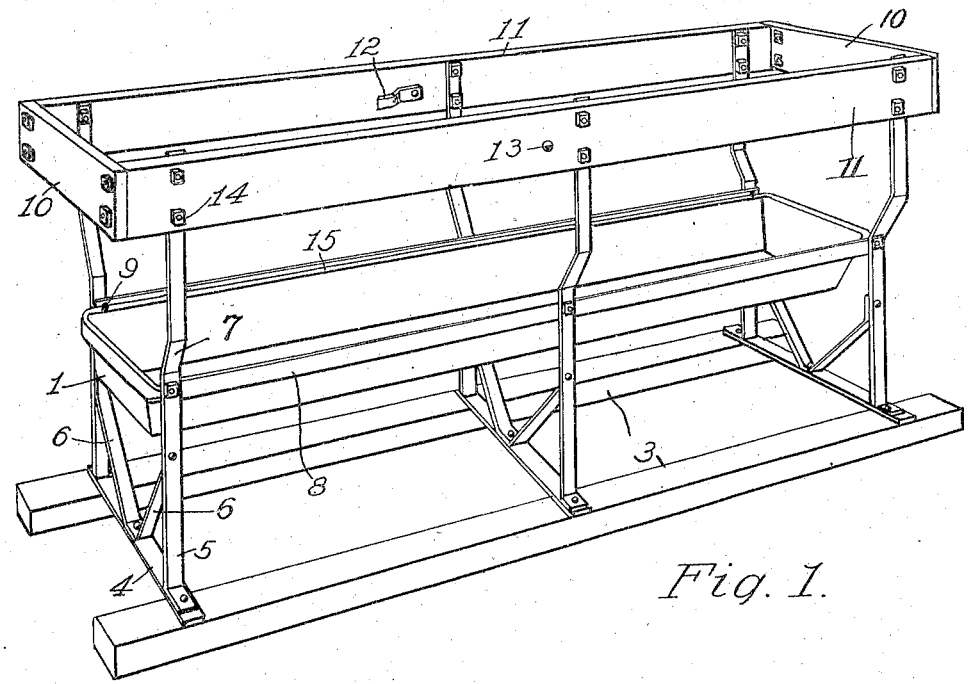
Figure 2:
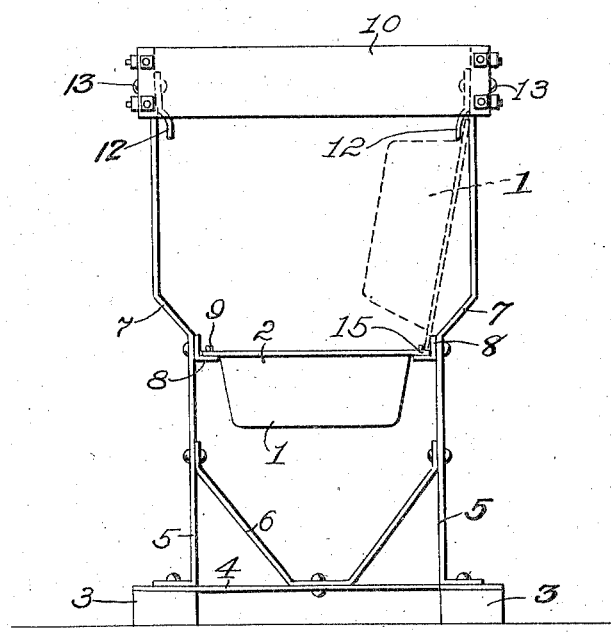

This object I have accomplished by the means which are hereinafter described and claimed, and which are illustrated in the accompanying drawings, in which Figure 1 is a perspective view of my improved device, and Fig. 2 is an end elevation thereof, with dotted lines indicating the tilted position of the feeding trough.

Similar numerals of reference denote corresponding parts throughout the several views.

It is known that sheep will not feed from a receptacle or feed trough whose contents have become fouled, and consequently, provision must be made for easily inverting and cleaning such a trough, as also to prevent the animals from getting thereinto.

In the device illustrated, is shown a relatively long, narrow and shallow feed trough 1, having sloping walls 2, and an outwardly flanged edge 15.

The numeral 3 denotes a pair of parallel beams connected by cross-bars 4, and upon the ends of said cross-bars are fixed standards 5, which are bent outwardly at 7 midway to widen their intervals.

Upon the tops of said standards an open rectangular horizontal frame composed of timbers 10 and 11 is secured by means of bolts 14. The standards 5 are supported by braces 6 which are mounted on the cross-bars 4. Angle-bars are fixedly mounted on the inner opposed faces of said standards, to have their parts or flanges 8 extend toward each other in the same horizontal plane, and have upwardly projecting studs 9 which are received into orifices of the flange 15 of the trough 1, when the said flange and trough are supported on said angle-bars, as shown in full lines in said Fig. 2. These studs prevent the trough from being dismounted by pushing of the animals while feeding.

The frame 10—11 serves as a fender to prevent the animals from getting into the trough.

The trough, as indicated by the dotted lines in said Fig. 2, may be tilted over to either side by lifting it up, hinging on the studs 9 on one side, so that its flange 15 will be supported on edge on the angle-bar 8 between the studs and the standards, to permit of cleaning out food remnants, and drying its interior after washing. To retain the trough in such a tilted position, I provide clip-bars 12 pivoted on bolts 13 to the inner walls of the frame side-bars 11, which clips may be swung downwardly over the trough-flange.

The trough 1 may be removed from its supports by lifting it bodily upwardly to clear the studs 9, and then withdrawing it from between the standards 5. This effectively guards the trough from accidental displacement, while permitting it to be removed when necessary.

Having described my invention, what I claim as new, and desire to secure by Letters Patent, is:

1. In a feeding device, spaced standards, shelves thereon having upwardly projecting studs, and a feed trough having an orificed marginal flange supported on said shelves with said studs received detachably in its orifices.

2. In a feeding device, spaced standards, shelves thereon, a feed trough removably supported on said shelves, and a hollow rectangular horizontal fender mounted upon the upper ends of said standards above and spaced from said feed trough.

3. In a feeding device, spaced standards, shelves thereon, a feed trough removably supported on said shelves, said standards being bent outwardly immediately above said shelves to widen their interspaces, and a hollow horizontal fender supported on the upper ends of said standards above and spaced from said feed trough.

4. In a feeding device, spaced standards, parallel angle-bars fixed on their inner faces, a feed-trough removably mounted on said angle-bars, a fender-frame fixed on the tops of said standards above and spaced away from said feed trough, and a movable clip mounted on said fender-frame adapted to removably engage said trough and hold it when in a tilted position.

Signed at Webster City, Ia. this 9th day of June, 1917.

EDWARD J. ROOD.

Witnesses:
 H. R. ASH,
 WM. BLANKENBUEHLER.

Copies of this patent may be obtained for five cents each, by addressing the "Commissioner of Patents. Washington, D. C."